United States Patent

Baumann et al.

[15] 3,658,179
[45] Apr. 25, 1972

[54] METHOD FOR SEPARATING LIQUID FROM SOLID SUBSTANCES AND STORING THE SOLID SUBSTANCES

[72] Inventors: Gustav Baumann, Untersiggenthal; Gerhard Hentschel, Neuenhof, both of Switzerland

[73] Assignee: Aktiengesellschaft Brown, Boveri & Cie, Baden, Switzerland

[22] Filed: Feb. 3, 1970

[21] Appl. No.: 7,380

Related U.S. Application Data

[63] Continuation of Ser. No. 689,440, Dec. 11, 1967, abandoned.

[30] Foreign Application Priority Data

Dec. 20, 1966 Switzerland ......................... 18180/66

[52] U.S. Cl. ................................. 210/66, 210/452
[51] Int. Cl. ........................................... B01d 57/00
[58] Field of Search .................. 210/416, 380, 266, 484, 452, 210/453, 454, 474, 29, 448, 364, 398, 495, 66, 499

[56] References Cited

UNITED STATES PATENTS

| | | | |
|---|---|---|---|
| 898,545 | 9/1908 | Barnes | 210/454 X |
| 1,331,732 | 2/1920 | Wait | 210/452 X |
| 1,352,961 | 9/1920 | Hills | 210/452 |
| 2,633,990 | 5/1953 | Simpson et al. | 210/266 X |
| 2,752,309 | 6/1956 | Emmons et al. | 210/29 |
| 3,147,220 | 9/1964 | Avery | 210/445 X |
| 3,200,622 | 8/1965 | Brucken | 210/380 X |
| 3,448,859 | 6/1969 | Hall et al. | 210/66 |

*Primary Examiner*—J. L. De Cesare
*Attorney*—Pierce, Scheffler & Parker

[57] ABSTRACT

Apparatus for separating liquid-solid mixtures such as water from ion-exchange resins and mud in connection with the operation of a nuclear power plant, or separating other mixtures such as acid or alkali containing liquids, and thereafter storing the separated out solids all in one and the same vessel. Located within the vessel which is initially open at the top, and in radially spaced relation from the vessel wall is a filter component in the form of a cylindrical sieve or filter bag. The liquid-solid mixture is introduced into the filter component and the liquid component filters through the wall of the sieve leaving the solids within the filter. The liquid is then drawn off from the vessel by a suction pipe, after which the suction pipe is then removed and the vessel is then closed tightly by a cover member provided for the top. If desired, the vessel can be centrifuged to further remove the water component from within the filter, or compressed air can be introduced into the interior of the filter to serve the same purpose. If the solids are ion-exchange resins which are radioactive, a water and/or ionizing radiation-absorbing agent such as a cement broth may be filled into the cavities remaining in the vessel between its wall and the filter component.

1 Claim, 2 Drawing Figures

Patented April 25, 1972  3,658,179
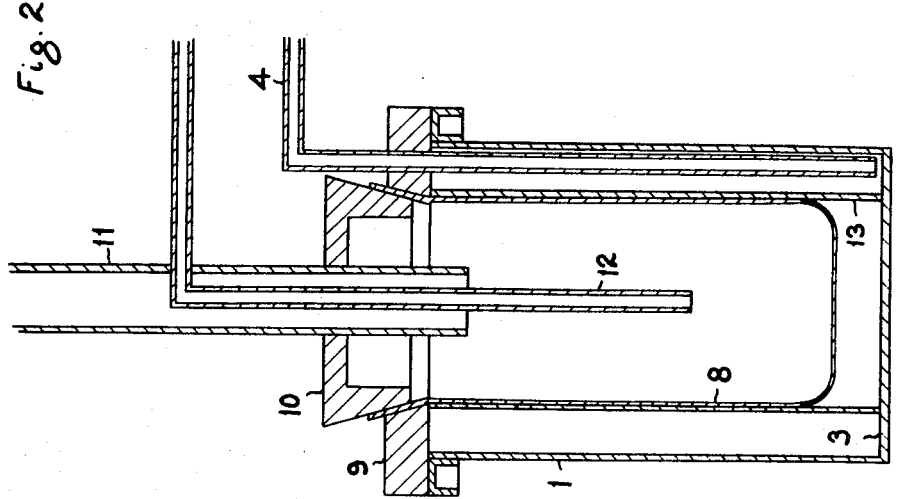
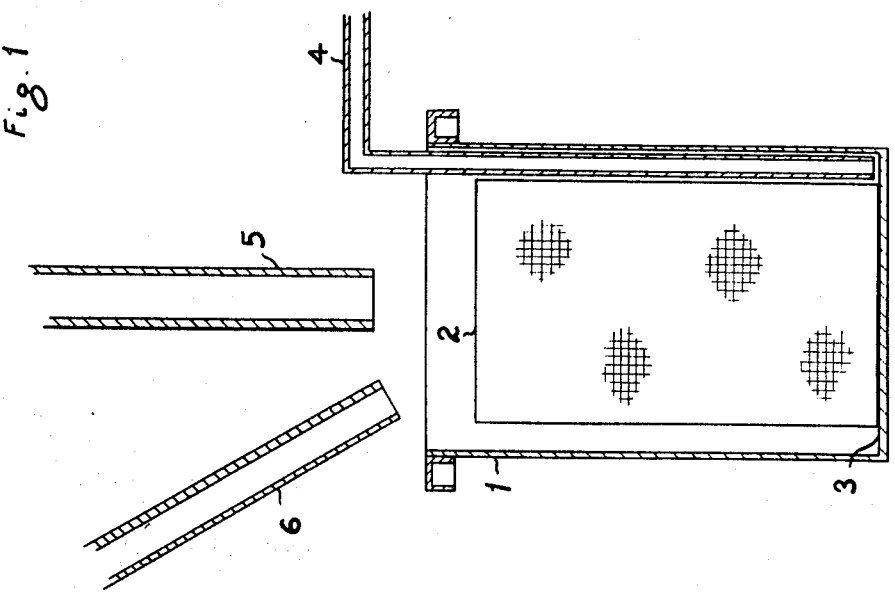
INVENTORS
Gustav Baumann
Gerhard Hentschel
BY
Pierce, Schiffler & Parker
Attorneys

METHOD FOR SEPARATING LIQUID FROM SOLID SUBSTANCES AND STORING THE SOLID SUBSTANCES This application is a continuation of application Ser. No. 689,440, filed Dec. 11, 1967, now abandoned.

The present invention concerns an apparatus for separating a liquid from solid substances contained therein and for the subsequent storage of the solid substances in a tight vessel.

If, for example, water is obtained in the operation of a nuclear power plant which contains ion exchange resins and filter mud, the water must be separated from the solid substances so that the latter can be enclosed in tight vessels and stored, for example, because they are radioactively contaminated.

The separation of the water from the solid substances and the subsequent storage is usually so effected that the spent ion exchange-resins and the filter mud contained in the water are conducted into collecting tanks in which the solid substances can settle and from which the clear water is drained off. If excessive radioactivity prevents immediate processing of the resins, they are stored in so-called decaying tanks until at least the short-lived radioactive isotopes have disintegrated to a great extent. Since the settled ion exchange resins and the filter mud still contain large amounts of excess water, the settled solid substances are mostly fed to a centrifuge and separated therefrom the water, particularly in order to reduce the volume. Solid substances treated in this manner are subsequently placed in tight vessels which are stored in a suitable place until the radioactivity has died out.

The known methods and apparatus have the disadvantage, however, that they require high investment costs, that they contain moving and mechanically highly stressed parts, which involves a greater susceptibility to trouble, and that the multiple transportation of the water and/or of the solid substances is complicated and, because of the radioactive impurities, dangerous. In particular the transportation of the finely ground resins, as they are now used, from the separator to the storage tank presents some difficulties. Finally, the constantly used apparatus and devices require expensive attendance, which is rendered very difficult by the presence of the radioactive impurities.

The object of this invention is to eliminate the above mentioned disadvantages. According to the invention the apparatus is characterized by a container whose top side is at least partly open, which can be sealed tightly with a cover, and which is equipped for filtering and storage; also a filter for separating the liquid from the solid substances, which is so arranged inside the vessel that the bottom of the vessel remains at least partly free for collecting the liquid as well as by a device for removing the liquid from the vessel.

The invention will be described more fully below on the basis of the attached drawings, wherein:

FIG. 1 shows schematically an apparatus according to the invention with a screen as a filter means; and FIG. 2 shows schematically another embodiment of the apparatus with a filter bag.

According to FIG. 1, a cylindrical sieve 2 is arranged in a storage vessel 1, which can be, for example, a commercial steel barrel. The intrinsic strength of sieve 2 is also selected that it is self-supporting and hence can stand freely on the bottom 3 of the vessel 1. Besides, its outside diameter is so much smaller than the inside diameter of vessel 1, that a movable vertical suction pipe 4 can be introduced from the top of vessel 1 in the resulting annular space between the vessel wall and the sieve, and that the bottom 3 remains partly free of the sieve 2, namely in an annular area along the bottom end of the vessel wall.

Above sieve 2 is arranged a pipe line 5 through which flows a mixture of water and solid substances, such as ion exchange resins and filter mud, into the sieve. The filtered water passing through sieve 2 into vessel 1 accumulates on the bottom 3 and is drained from there, preferably continually, through the suction pipe line 4. As soon as the sieve is filled with the solid substances and the water is drained off, drain pipe 4 is removed. Then the remaining cavities, particularly the cylindrical cavity between the vessel wall and the sieve, is filled with a water-binding and ionizing radiation-absorbing agent, for example, cement broth issuing from another pipe line 6. This measure, by binding the remaining water, provides additional protection against corrosion, also additional shielding of ionizing rays of the solid substances and additional tightness of the vessel. Finally the vessel is tightly sealed with a cover (not represented) and brought to the provided storage place.

Another embodiment of the apparatus has, according to FIG. 2, again the vessel 1 provided for storing the solid substances. Inside vessel 1 is arranged a filter bag 8, which is preferably a paper - or cloth filter and which is suspended in the upper part of the vessel. At this end the top side of the vessel is closed with a cover consisting of an outer ring 9 and an inner conical plug 10. The upper edge of filter bag 8 is clamped between the conical faces of ring 9 and of plug 10. This clamping device can be a pneumatic device, for example. The length of filter bag 8 is so dimensioned that the bottom 3 remains free.

In plug 10 is arranged a central pipe 11 through which the mixture of water and solid substances flow into filter bag 8. The water accumulating on bottom 3 after the filtering 3 is drained off, preferably continuously, through pipe line 4 arranged vertically along the inner wall of vessel 1, which passes through an opening in the cover ring 9.

In order to accelerate the filtering, an overpressure can be produced in the filter bag. This can be achieved, for example, by over-pressure in the mixture water/solid substances itself, or, after closing pipe line 11, by injecting compressed air, to which end a pipe 12 is supported coaxially within pipe line 11. The compressed air can also be introduced directly into the liquid which results in a turbulence of the solid substances in the water. Plug 10 must be tightly sealing in this apparatus.

If desired, in order to reduce further the water content of the solid substances contained in filter bag 8, the contents of the filter bag can be centrifuged. This is effected in a simple manner in vessel 1 itself by removing pipe lines 4, 11 and 12 and placing vessel 1, which is, for example, a commercial barrel, on a turntable provided with a corresponding centrifuge and rotating it about its own longitudinal axis. The water still contained in filter bag 8 is thus forced to the outside by the filter bag and accumulates, particularly after the turntable has stopped, on bottom 3, from where it is drained off by inserting again line 4. In order to prevent filter bag 8 from turning eccentrically during centrifuging and from breaking, it is of advantage to surround it with a strong but water-permeable shell 13. This shell can be, for example, a sufficiently strong mesh which is placed in vessel 1 and into which the filter bag 8 is introduced tightly hugging the bag, the foraminous shell 13 standing on the bottom wall 3 of vessel 1.

In a similar manner can also be centrifuged the solid substances contained in sieve 2 in the apparatus represented in FIG. 1.

After the filtering and centrifuging respectively and draining of the water accumulated on bottom 3, a residual water binding and/or ionizing radiation-absorbing agent, like cement broth, can be introduced in the embodiment represented in FIG. 2, through a corresponding pipe line into the remaining cavities. Vessel 1 is then again tightly sealed and brought to the provided storage place.

Other liquids, like solutions, acid- or alkali-containing liquids, can also be separated in an advantageous manner with the above described apparatus from the solid substances contained therein, if the latter are to be stored in tightly sealed vessels and manipulation of the solid substances such as transferring, transporting etc. is to be avoided because of its dangerous nature, for example, because of high toxicity etc.

In the above described process, the necessity of a further transfer of the mixture liquid/solids or of the solids from the above mentioned collecting tanks or decaying tanks, if any, to intermediate tanks with the resulting decanting or transportation is completely avoided. In particular the solid substances are in any phase of the process, until they have arrived in the vessel for final storage, in a form in which they are easy to transport, for example, to pump, and in which they can be readily removed to clean the parts of the plants. Apart from the easy-to-clean pipe lines for filling the vessel and draining off the liquid obtained there are no devices that need attendance. The costs for lost filter means inserted in the vessel, such as the sieve or filter bag, are very low. Besides, there are no investments necessary for centrifuging and for maintenance work for a centrifuge vessel, required heretofore.

We claim:

1. The method for separating liquids from radioactive contaminated solids such as that produced in connection with the operation of a nuclear power plant and for subsequently storing the filtered out solids which comprises the steps of introducing the liquid-solids mixture into a combined filtering and storage vessel wherein the solids are retained within a filter component spaced from the wall of the vessel, removing the liquid from the vessel, introducing a water binding and radiation absorbing cement broth into said space between the filter component and vessel wall after the liquid has been removed to provide protection against corrosion of the vessel and additional shielding for the contaminated filtered out solids, and thereafter sealing the vessel for storage.

* * * * *